United States Patent [19]

Stavis

[11] 4,160,974
[45] Jul. 10, 1979

[54] TARGET SENSING AND HOMING SYSTEM
[75] Inventor: Gus Stavis, Wayne, N.J.
[73] Assignee: The Singer Company, Little Falls, N.J.
[21] Appl. No.: 736,785
[22] Filed: Oct. 29, 1976
[51] Int. Cl.² ............................................. G01S 9/22
[52] U.S. Cl. .............................. 343/16 M; 244/3.19; 343/7 ED
[58] Field of Search ...... 343/16 M, 100 ME, 100 SA; 244/3, 19

[56] References Cited
U.S. PATENT DOCUMENTS

| | | | |
|---|---|---|---|
| 2,998,942 | 9/1961 | Kuck | 244/3.19 X |
| 3,181,813 | 5/1965 | Gulick | 244/3.19 |
| 3,740,002 | 6/1973 | Schaefer | 244/3.19 |
| 3,949,955 | 4/1976 | Sykes et al. | 244/3.19 |

Primary Examiner—T. H. Tubbesing
Attorney, Agent, or Firm—L. A. Wright; T. W. Kennedy

[57] ABSTRACT

A low cost system using passive radiometry or active radar for the detection of a target and providing discrimination between desired targets and false targets. The device may be mounted on a drone aircraft or other vehicle and comprises a detecting sensor having a fixed antenna system whose function is to detect the presence and direction to a target in airframe coordinates. The sensor provides means for generating a broad fan beam containing a plurality of closely spaced interference lobes spaced so as to encompass a predetermined target size. The interference lobes are continuously swept across the line of travel and the receiving circuitry provides means for detecting a desired target within the interference lobes. The system also provides a pre-programmed means, initiated by the target sensor, designed to aim the aircraft at the target and a target tracker or homing means having a fixed antenna directed along the heading axis of the drone aircraft and used to "home" the aircraft into the target.

13 Claims, 9 Drawing Figures

TARGET SENSING AND HOMING SYSTEM

This invention relates to a system using passive radiometry or active radar to provide discrimination between desired targets and false targets reflected by the terrain and/or temperature variations.

BACKGROUND OF THE INVENTION

It is desired to provide a target seeker and homing sensor which is low cost, light weight and capable of detecting the presence and direction to a discrete target such as a tank, for example. It is also desired that the target seeker be suitable for use in a mini-drone aircraft. The operating altitude for the sensor should be 1000 to 5000 feet; it should scan a 2000 foot wide region of ground across its flight path while moving at 50 knots and should have a reasonable probability of detection and a low false alarm rate.

The operation of the seeker involves looking for targets of opportunity and, upon detection, providing guidance signals to steer the aircraft into the target.

BRIEF DESCRIPTION OF THE INVENTION

The target seeker of the present invention comprises a target sensor having a fixed antenna system with the function of detecting the presence and direction to a target in airframe coordinates. The system also comprises means providing a preprogrammed maneuver initiated and selected by the target sensor and designed to aim the aircraft at the target. The third major component of the target system comprises a target tracker having a fixed antenna directed along the heading axis of the aircraft and used to "home" the aircraft into the target. The invention contemplates both active (radar) and passive (radiometric) sensors and the performance capabilities of both are discussed herein. However, for the immediate purpose of the general description, it will be assumed that a passive radiometer operating at 35 GHz will be used.

Accordingly, it is an object of this invention to provide a target seeker having a fixed antenna having the function of detecting the presence and direction to a target in airframe coordinates.

Another object of this invention is to provide a target seeker having a pre-programmed maneuver initiated and selected by the target sensor, designed to aim the aircraft at the target.

It is another object of this invention to provide a target seeker having a fixed antenna directed along the heading axis of the aircraft employed to direct the flight of the aircraft into the target.

These and other objects, features and advantages of the present invention will become apparent from the following description taken in conjunction with the accompanying drawings wherein.

Figure 1:
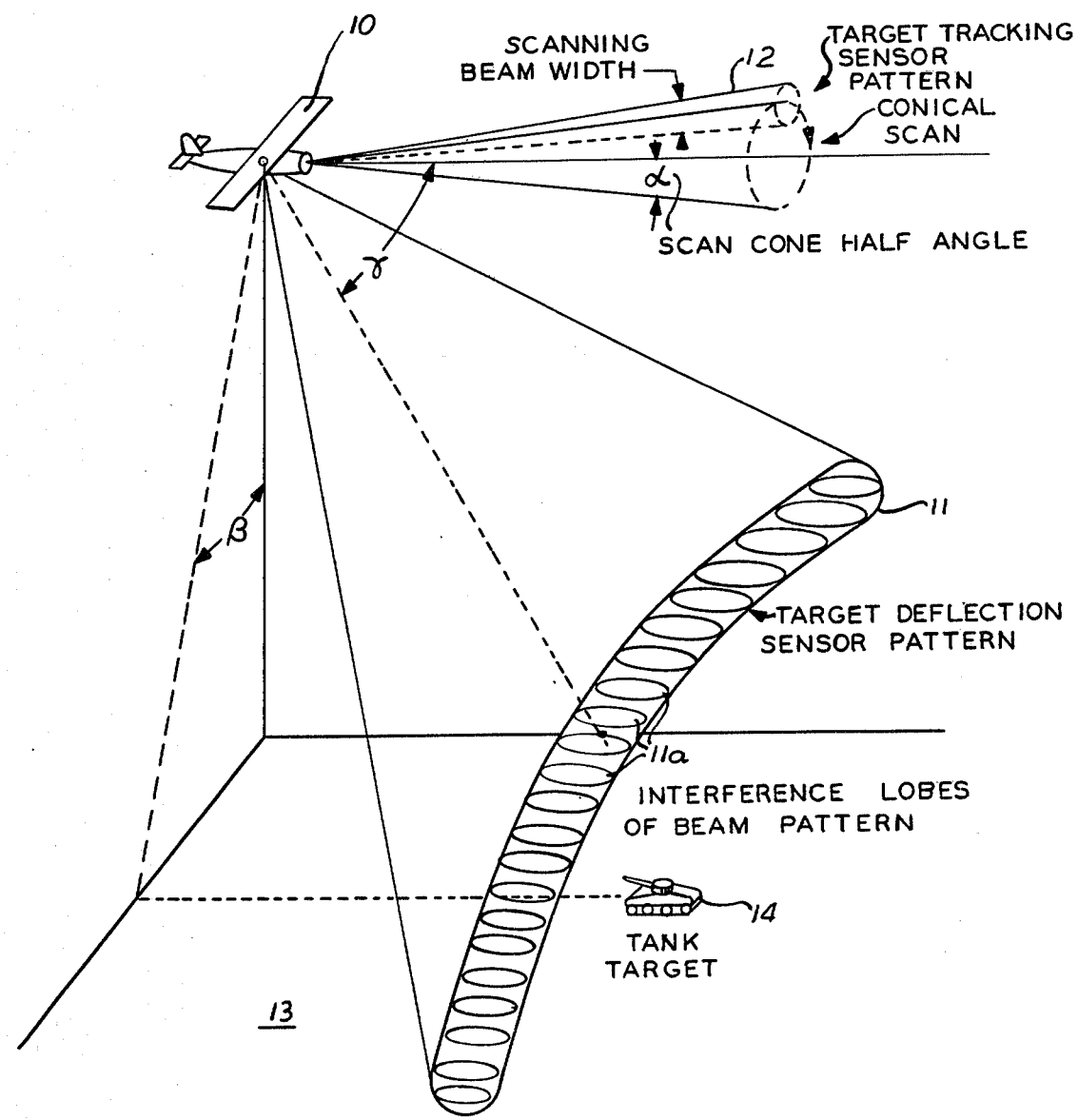
FIG. 1 shows the general antenna beam configuration.

Referring to FIG. 1, there is shown the target detection beam 11 and target tracking beam 12 emanating from drone aircraft 10. The philosophy of this system involves searching a swath of ground 13 generated by the total width of the detection pattern and by the forward motion of aircraft 10. When a target 14 falls within beam 11, its presence and location $\beta$ along the width of the beam will be determined. The shape of beam 11 in space will be a section of a conical shell of half angle $\gamma$ (so that its intersection on the ground is a hyperbola). First aircraft 10 will be put into a roll maneuver through angle $\beta$ so as to place the target in the plane containing the aircraft's longitudinal axis perpendicular to the deck plane. Then a downward pitch maneuver is commanded through a fixed angle $\gamma$ so as to put the target tracker beam 12 on the target. The width of this latter beam is sufficient to accomodate the errors in pointing the aircraft, so that it can acquire and lock to the target, and guide the aircraft to a hit.

The advantages proposed for this mode of operation described with regard to FIG. 1 are:

1. Elimination of the need for antenna gimbals, since all of the search and track signals are performed by simple electronic scanning.

2. High speed scanning of the overflown terrain which provides complete coverage of the selected area without gaps.

3. The use of spatial filtering to provide discrimination against terrain background (false targets) and to permit very narrow post-detector bandwidth.

4. The use of state of the art hardware and technology.

Turning again to the detection sensor, the target of interest for purposes of this description is a battle tank which has a projected physical area of about 200 square feet. The radiometric temperature of the tank is about 150° K. less than that of the surrounding terrain, and this temperature difference would be sensed by a radiometer having a very narrow antenna beam so that the tank would fill the beam. Where the beam is larger than the tank, the contrast is diluted by the ratio of tank area to terrain area included within the beam.

FIG. 1 shows a thin, wide beam 11 for the detection sensor. If the desired width of scan is 1000 feet and the longitudinal thickness of the beam is made equal to 20 feet, then the tank contrast would be:

$$150° K. \times (200/20,000) = 1.5° K.$$

This might be a discernible signal to the radiometer in terms of its minimum temperature sensitivity. However, it is too small a signal to find against the background temperature variation using a conventional radiometer.

A survey of radiometer map data (and these are borne out by static measurements of grass, rock, sand, etc.) indicates that terrain temperature variations (on the average) can be characterized as having an rms value of 20° K. and a correlation distance of 500 feet. Thus, it is reasonable to conclude that a 1.5° K. target would not be detected against a 20° K. rms background. To overcome this limitation without having to resort to very large antennas (at a wavelength λ=0.377″, an antenna which would cover 200 sq. ft. from 2500 ft. range would be:

$$2500/(\sqrt{200}/\lambda).$$

The novel configuration of antenna patterns offered herein utilizes a simple spatial filter to selectively enhance the tank signal relative to the background variation. The antenna pattern is actually two sets of patterns, namely a closely spaced set of interference lobes 11a shown in FIG. 1, contained within the broad fan beam 11 which, as will be explained later, is actually a monopulse set of beams.

Figure 2:
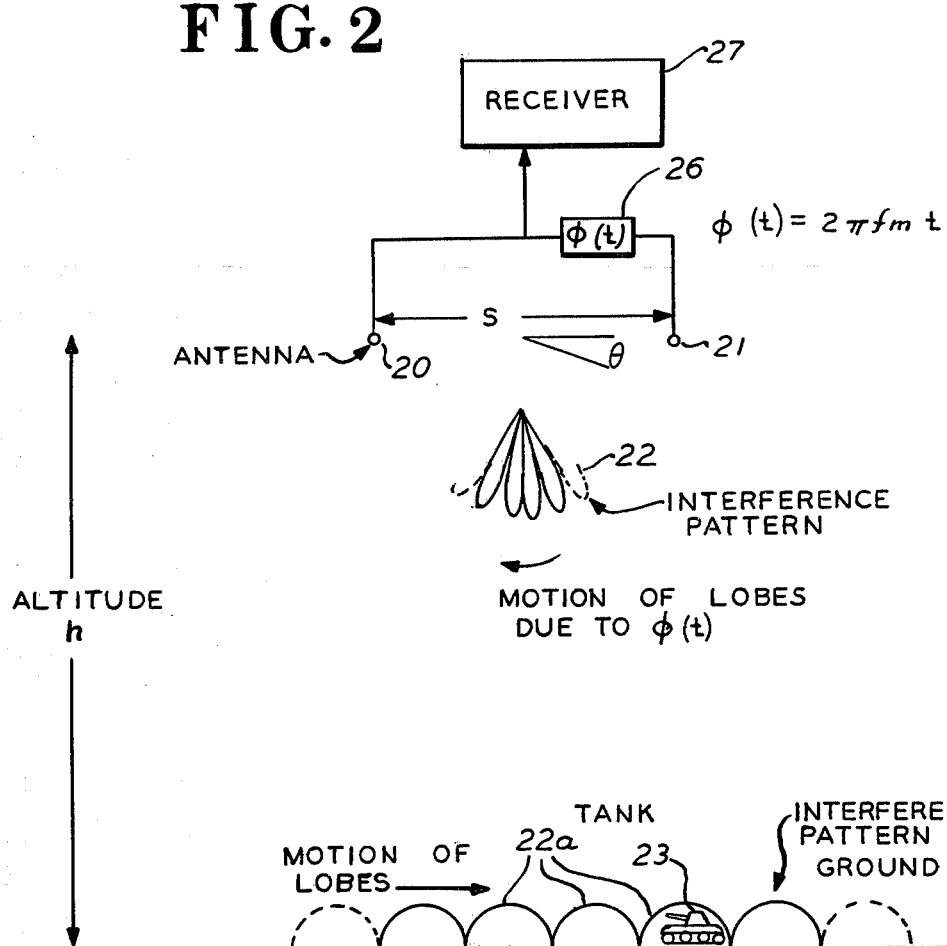
FIG. 2 shows the interference pattern generated by a pair of isotropic antennas separated by a known distance.

The nature of and reason for the interference pattern will be described with reference to FIG. 2. At the top of FIG. 2, there is shown a pair of isotropic antennas 20 and 21 separated by many wavelengths S so that a multilobed interference pattern 22 is generated. The spacing S is chosen on the basis of having the illustrative tank target 23 substantially fill a lobe 22a at the chosen altitude, h. Next, consider that the two antennas 20 and 21 are tied together through a continuously varying phase shifter 26, which introduces a phase $\phi(t)=2\pi f_m t$, so that the interference pattern is moved along in the direction of the arrow to scan the ground. The received signal from tank 23 will be modulated at frequency ($f_m$) by the movement of lobes 22a. Furthermore, the depth of modulation will be large because the lobe size is chosen to be optimum for the tank target. Terrain variations of radiometric temperature are discriminated against because of the much larger correlation distance (500 feet) associated with them and the gross mismatch relative to the lobe size. The scanning finger pattern 22 is in essence a spatial filter and will favor responses from a narrow range of target sizes.

The scanning lobe benefit permits a simultaneous and very rapid scan of a wide angle across the ground track by merely shifting the phase between the antennas, while offsetting the beam dilution loss suffered because the target does not fill the beam. Of course, the actual antennas 20 and 21 used would not be isotropic, but would be in fact linear arrays made up of slotted waveguide. The pattern emanating from the waveguide arrays would be squinted forward about 30°-45° from the nadir yielding the conical shape previously mentioned. The lengths of these arrays may range up to 4 feet to provide a beam thickness of 20 feet along the ground track direction.

Figure 3:
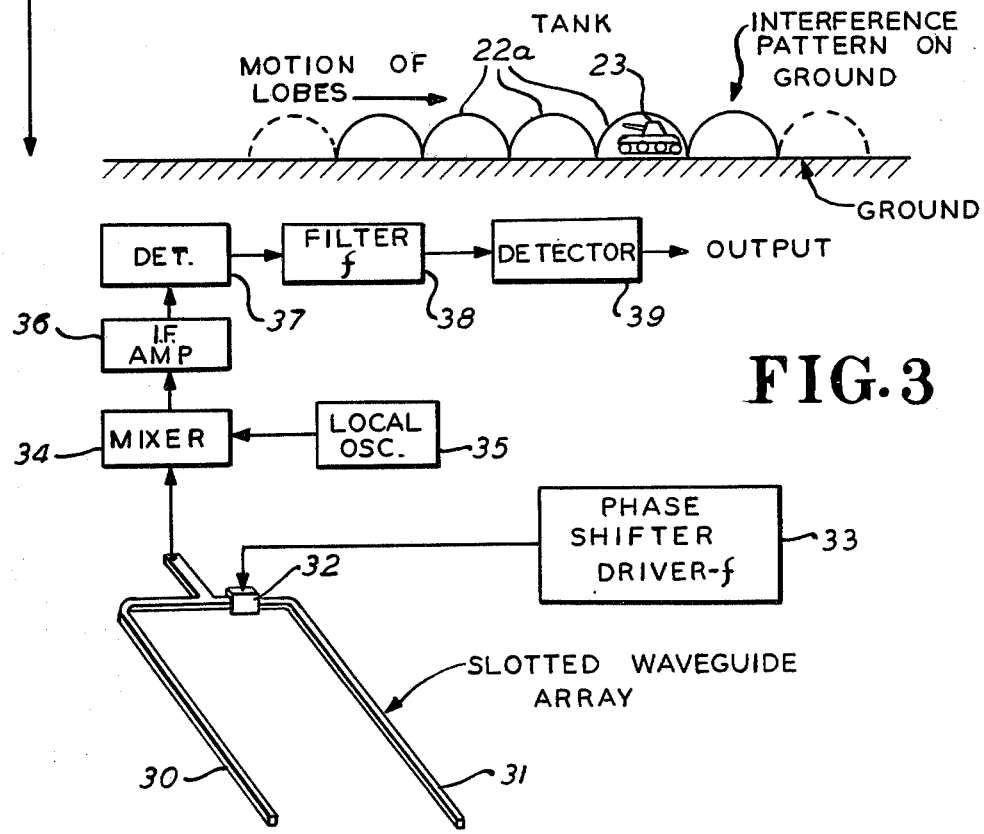
FIG. 3 shows a functional block diagram of a rudimentary sensor incorporating the principles of the invention.

As seen in FIG. 3, the sensor described would consist of the two antennas 30 and 31. Connected between antennas 30 and 31 is phase shifter 32, driven by phase shifter driver 33. The signals received by antennas 30 and 31 and modulated by phase shifter 32 are fed to mixer 34. In mixer 34, the received signals are combined with signals from local oscillator 35 to generate an IF signal, which in turn is applied to IF amplifier 36. The output of IF amplifier 36 is applied to a first detector 37 where the target signal is identified. The signal from detector 37 is filtered in filter 38 and then applied to a second detector stage 39. The output of detector 39 is then applied to other processing stages for sensing the target. The block diagram of FIG. 3 shows a rudimentary sensor and does not provide direction to the target.

Figure 4:
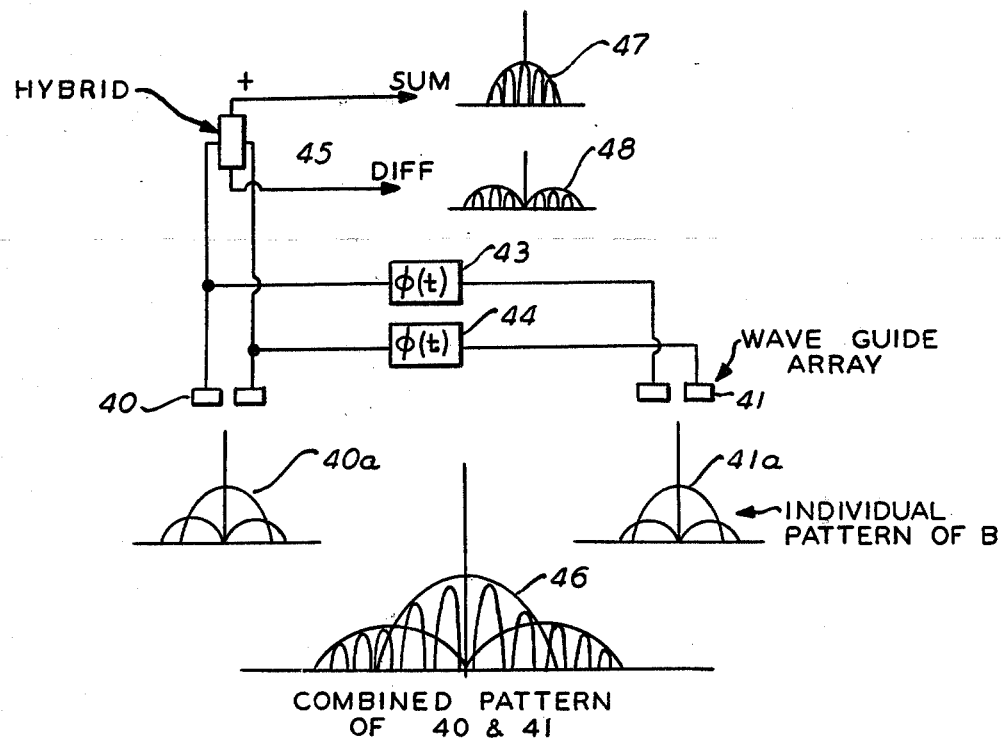
FIG. 4 shows antenna pairs for generating a monopulse array.

Turning now to FIg. 4, there are shown two antennas 40 and 41. These antennas replace the antennas previously described with monopulse pairs. Antennas 40 and 41 acting together will still have the fine lobe structure previously described, but the envelope pattern, within which these fine lobes are contained, will be the monopulse pattern 46 associated with each antenna group 40 and 41. Now if a tank target is contained within the beam, both the sum output 47 and the difference output 48 from the hybrid circuit 45 will contain the target signal at frequency f (the scanning lobe rate produced by phase shifters 43 and 44). The ratio of the difference to sum signals will be a measure of the angle away from ground track to the target. This is the angle β in FIG. 1. Thus, means are provided for detecting the presence of a target and for determining its location along the width of the beam.

Figure 5:
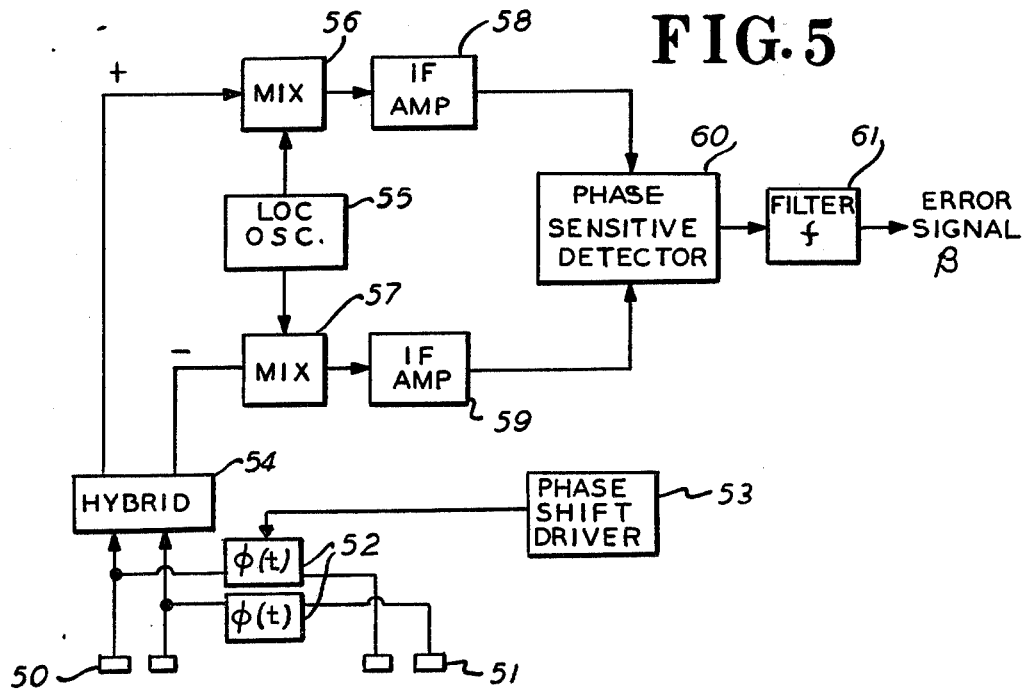
FIG. 5 is a functional block diagram of the detection sensor incorporating the features of the monopulse array.

FIG. 5 shows a functional block diagram which incorporates all of the described features. Connected between antennas 50 and 51 are phase shifters 52 driven by phase shifter driver 53. The signals received by antennas 50 and 51 and modulated by phase shifters 52 and fed to hybrid circuit 54 which in turn provides a sum output to mixer 56 and a difference output to mixer 57. In mixers 56 and 57, the received signals are combined with signals from local oscillator 55 to generate a sum IF signal to be applied to IF amplifier 58 and a difference IF signal to be applied to IF amplifier 59. The outputs of IF amplifiers 58 and 59 are applied to phase sensitive detector 60 which provides at its output a signal representing the direction of the target away from the ground. The output from phase sensitive detector 60 is filtered by filter 61 providing at its output error signal β.

Figure 6:
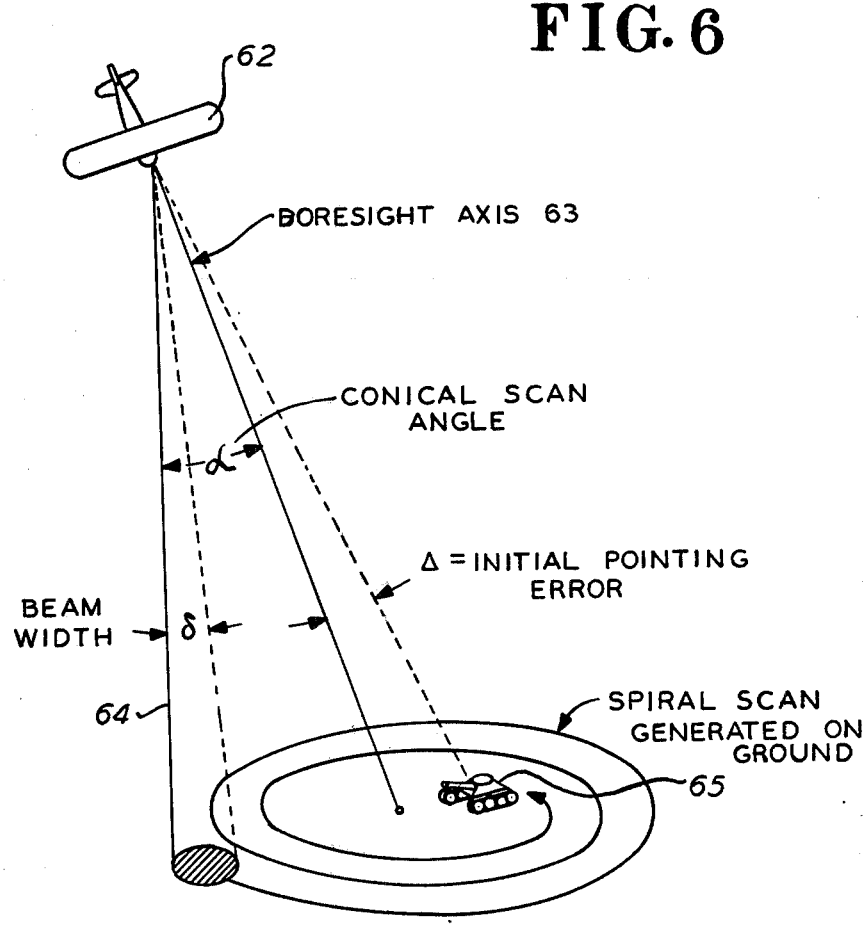
FIG. 6 shows the beam configuration of the aircraft homing mode.

Referring to FIG. 6, the target homing sensor beam configuration is shown. Having detected the presence of and the direction to a target, it is necessary to have a target chase or homing sensor for the final guidance to the target. The homing sensor is fixed to look along the longitudinal axis 63 of aircraft 62. Its beam is conically scanned at an offset angle α around the boresight. The scanning beam 64 has a beamwidth δ, which may be significantly smaller than α. In FIG. 6, the aircraft is in a homing mode and shows the nature of the homing scan pattern on the ground. The choice of conical scan angle α must be large enough to accommodate the error in initial target detection error and the error in handing over the target to the homing sensor through the aircraft maneuver. This initial pointing error is shown as Δ in FIG. 6. As the aircraft dives and loses altitude, the conical scan will describe a diminishing spiral on the ground. If the tank 65 is contained within the initial scan diameter, then it will be crossed by the beam and a steering correction signal will be available. The choices of the various angles will, of course, depend heavily on the aircraft performance capability and on the guidance and control mechanization, but some reasonable choices might be α=8.5° and δ=2°. The latter number is reasonable based on a 10 inch diameter antenna in the nose of the aircraft. The scan could be done electronically or mechanically by spinning a reflector at the feed focus of a paraboloid.

At long range (e.g., 3000 feet), the two degree beamwidth suggested previously would cover a diameter (105 ft.) on the ground much larger than the tank (10×20 ft.). The ratio of the tank area to beam area of this situation makes the probability of detection and false target rate unfavorable. In this case, the initiation of the homing sensor should be inhibited until the range is less than 3000 feet. If, for example, the open loop guidance of the aircraft from time of target detection to completion of the dive maneuver can provide a ±3° accuracy then the search radius on the ground needs to be 3000 (tan 3°) or about 150 feet. If the homing sensor is inhibited by the altimeter/inhibit circuit 78 until the aircraft is down to 1000 ft. altitude, then a conical scan angle of 8.5° will cover that radius and capture the target. At the 1000 ft. altitude, the target temperature is diluted to about 31° K., which is nine times better than at 3000 ft. altitude and the probability of detection is excellent. This all assumes that the aircraft can steer an 8.5° correction from 1000 ft. altitude.

Figure 7:
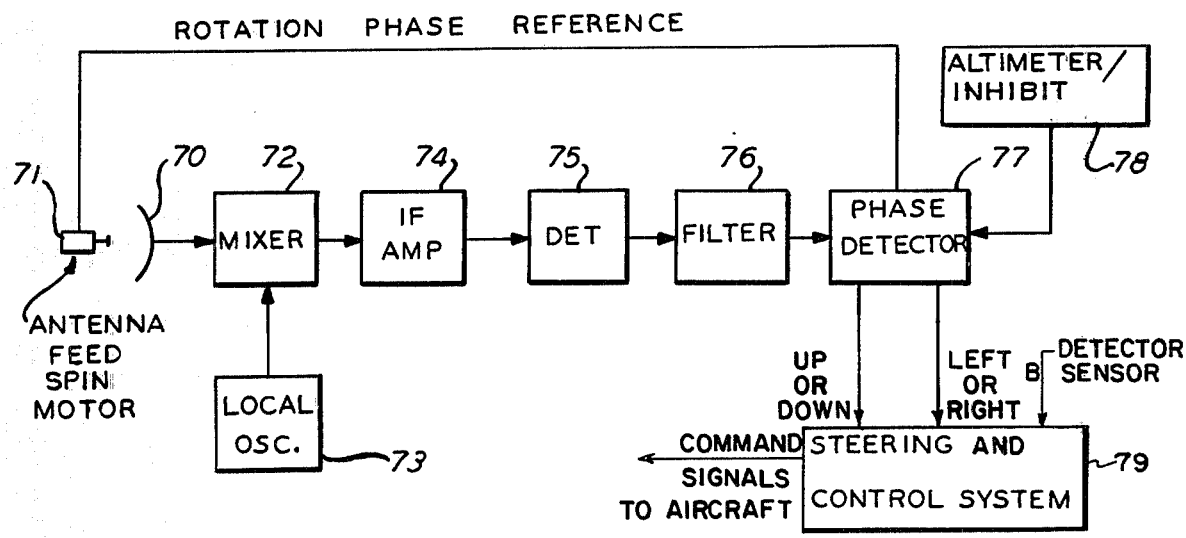
FIG. 7 is a block diagram of the homing sensor.
Figure 8:
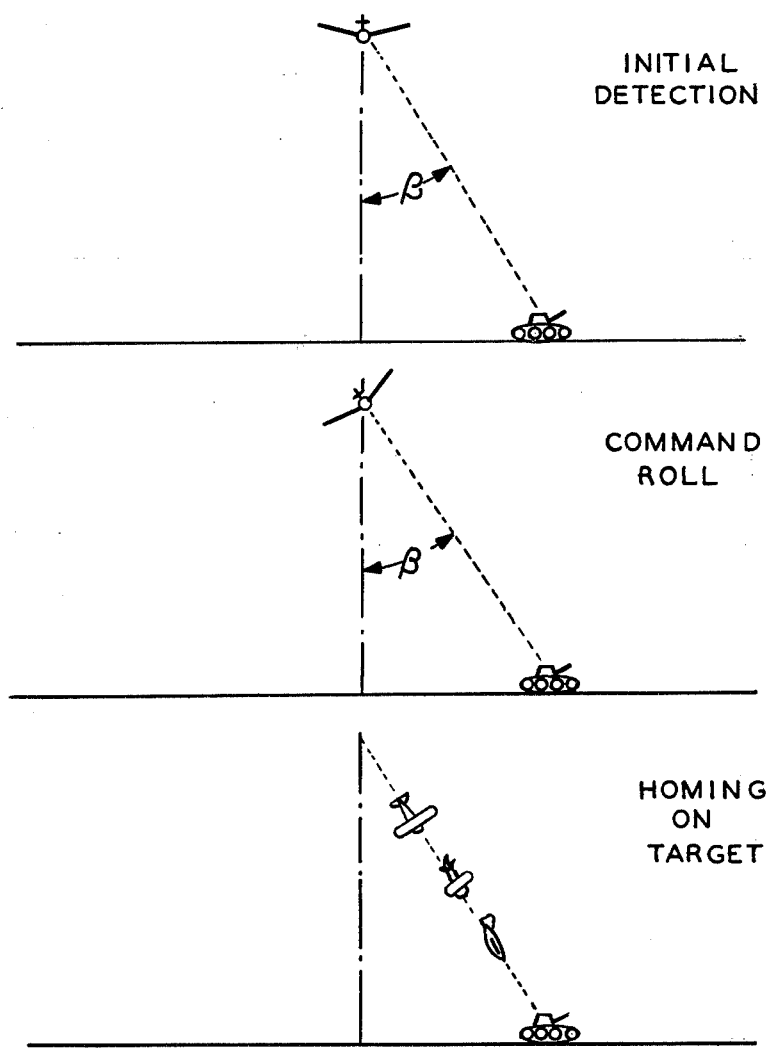
FIG. 8 shows the homing maneuver which directs the aircraft to the target.

FIG. 7 shows a block diagram for the homing sensor. It comprises a parabolic antenna 70 having a spinning reflector 71 at the feed focus of the paraboloid of antenna 70. Signals received by antenna 70 are fed to mixer 72 where they are combined with signals from local oscillator 73 to provide an IF signal for application to IF amplifier 74. The signal is amplified in amplifier 74 and applied to detector stage 75 where the target signal is removed from the carrier. The signal from detector 75 is filtered in stage 76 and then applied to phase detector 77 which in turn provides steering signals to move the homing sensor beam up or down, or left or right. A rotation phase reference from reflector 71 and an altitude inhibit signal from block 78 are also provided as inputs to phase detector 77. The steering and control system block 79 receives signals from phase detector 77 and the error signal $\beta$ from the detector sensor of FIG. 5. With these inputs to block 79, it initiates pre-programmed maneuver signals (see FIG. 8) for application to aircraft 62.

Basically, the block diagram of FIG. 7 is a simple contrast radiometer with a scanning beam antenna and provides an error signal giving direction and angle to the target measured from the boresight axis. The nature of the error signal being associated with a fixed cone angle $\alpha$ will cause the aircraft to fly a slightly curved path into the target. Actually, when the range is reduced to where the tank subtends the angle $\alpha$, the path will become essentially straight.

Referring back to FIG. 1, the aircraft maneuver for handover begins when the detection sensor provides a signal which identifies the time a target appears within the conical fan beam and the angle $\beta$ to the target. In order to point the airplane at the target, one possible combination of maneuver would be to command a roll angle $\beta$ away from the target so that the target lies in the plane containing the aircraft's longitudinal axis and normal to the deck plane (see FIG. 8).

From this position, a dive at the angle $\alpha$ (see FIG. 1) will point the aircraft at the target. Simultaneously, the radiometer logic can switch the control signal input from the detection sensor to the homing sensor for final guidance. These maneuvers should be programmable on an open loop basis if the homing sensor acquisition cone can accommodate enough of an error in initial pointing. Aircraft response and flight paths should be adequately known.

The preceding description has been confined to consideration of a passive radiometric sensor. However, an active radar sensor is equally applicable with this invention. The radar may be unmodulated (i.e., CW) or modulated (i.e., Pulsed, FM). In either case, the antenna patterns and the principle of operation remain unchanged.

Figure 9:
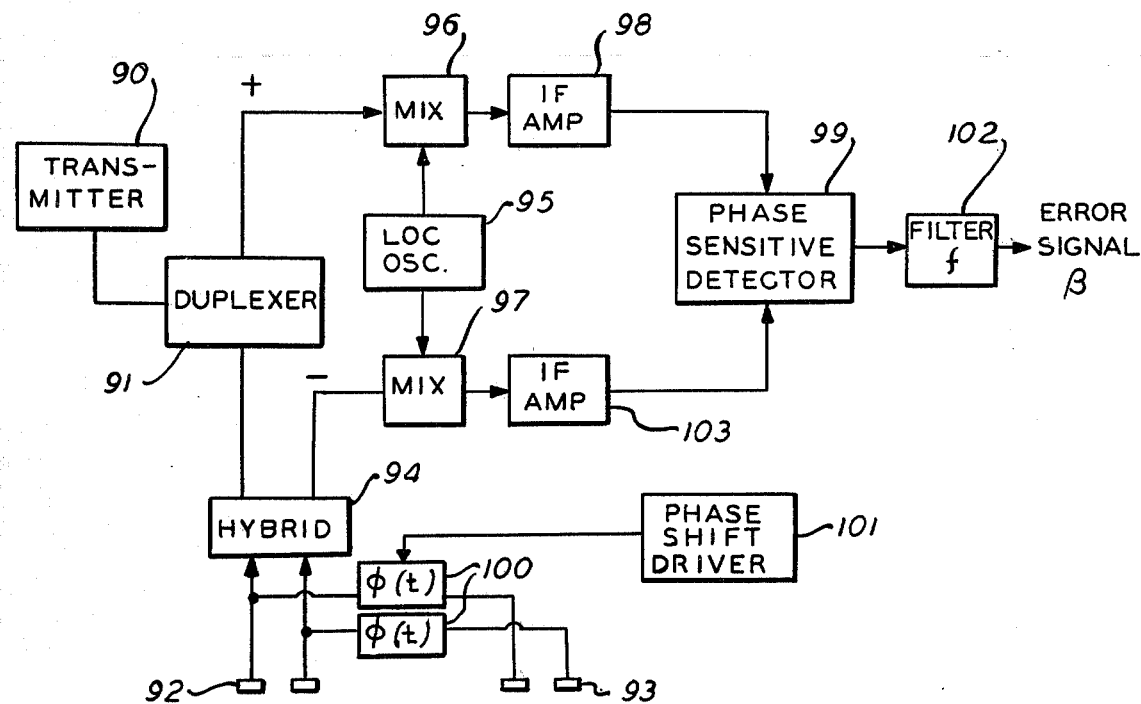
FIG. 9 is a functional block diagram of a radar implementation of the invention.

FIG. 9 shows a block diagram of a radar implementation of this invention. The diagram is similar to that for the passive radiometric sensor except for the addition of a transmitter 90 and a duplexer 91. The function of the duplexer 91 is to allow the flow of transmitter power to the antennas and preclude the flow of direct transmitter power to the mixer 96. It also allows the flow of received echo signal to the mixer 96 and excludes such signal from flowing to the transmitter 90. Antenna pairs 92 and 93, IF amplifiers 98 and 103, hybrid circuit 94, filter 102, phase sensitive detector 99, phase shifter 100, and phase shifter driver 101 serve the same function as described with regard to FIG. 5. The received echo signal from the target illuminated by the radar will possess the amplitude modulation imposed by the sweeping antenna lobes and will be processed in the same manner as was the radiometric signal previously described.

From the foregoing, a target sensing and homing system having means to detect a target, means programmed to maneuver the aircraft to the target, and tracker means to home in on the target has been disclosed. While a particular embodiment of the invention has been shown and described, modifications may be made, and it is intended in the following claims to cover the embodiments which fall within the true spirit and scope of the invention.

What is claimed is:

1. A target sensing and homing device comprising:
    a drone aircraft carrying said sensing and homing device,
    means having a fixed antenna system for detecting the presence and direction to a target in airframe coordinates,
    pre-programmed means initiated by said detection means for aiming said aircraft at said target, and
    means having a fixed antenna directed along the heading axis of said aircraft for homing said aircraft into said target.

2. The target sensing and homing system of claim 1 comprising:
    means in said sensing device for generating a broad fan beam containing a pattern of closely spaced interference lobes said interference lobes being spaced from each other so as to encompass a predetermined target size, and
    means for continuously varying the position of said interference lobes whereby said target is detected by said interference lobe.

3. The target sensing and homing system of claim 2 wherein said means for generating said broad fan beam containing said interference lobes comprises:
    first and second interconnected antenna means for propagating said broad fan beam containing said interference lobes, and
    a phase shifter for varying the position of said interference lobes.

4. The target sensing and homing system of claim 3, comprising:
    means for inhibiting said homing means until said aircraft reaches a predetermined altitude.

5. A radar target sensing and homing device comprising:
    an antenna and transmitter for transmitting a broad fan beam containing a plurality of closely spaced interference lobes said lobes being spaced so as to encompass a predetermined target size,
    a receiver and said antenna for receiving echo signals from targets present in said interference lobes, means interconnected between said transmitter and receiver for preventing transmitted signals from entering said receiver during transmitting periods and for permitting reception of said echo signals in said receiver means during receiving periods, means for continuously varying the position of said interference lobes, said antenna and said position varying means determining the ratio of the target to the beam area whereby the detection of false targets is reduced, means responsive to said antenna for developing sum and difference signals, a first mixer stage in said receiver for receiving the sum output signal, a second mixer stage in said receiver for receiving the difference output signal, a local oscillator in said receiver providing outputs to said first and second mixer stages for generation of sum and difference intermediate frequency signals, a phase sensitive detector in said receiver, and first and second IF amplifiers in said receiver for amplifying said sum and difference signals respectively as inputs to said phase sensitive detector said phase detector measuring the ratio of the sum and difference signals to provide an output signal which represents the angle to the target.

6. The radar target sensing and homing device of claim 5 comprising:

aircraft means for carrying said radar target sensing and homing device, pre-programming means responsive to the detection of said target for maneuvering said aircraft means to lock on to said target, and means for directing said aircraft means into said target.

7. In a target sensing device a sensor means comprising:

first and second interconnected slotted waveguide antenna means for generating a broad fan beam and a plurality of closely spaced interference lobes contained within said broad fan beam said interference lobes spaced so as to encompass a predetermined target size at a predetermined range, a phase shifter for continuously varying the positions of said interference lobes within said broad fan beam, means for detecting said predetermined size target within said interference lobes, and means combined with said means for detecting for filtering out undesired targets.

8. The target sensing device of claim 7 wherein said means for detecting said target comprises:

a mixer stage connected to each of said antenna means, a local oscillator connected to said mixer stage for generating an intermediate frequency signal, an IF amplifier connected to said mixer for amplifying said intermediate frequency signal, and a detector stage connected to said IF amplifier for detecting said target present in said interference lobes.

9. In a target sensing device a sensor means comprising:

means for generating a broad fan beam containing a plurality of closely spaced interference lobes said interference lobes spaced so as to encompass a predetermined target size, said generating means also receiving target returns, means for continuously varying the position of said interference lobes within said broad beam, means for developing sum and difference signals from said received signals, a first mixer stage for receiving the sum output signal, a second mixer stage for receiving the difference output signal, a local oscillator providing outputs to said first and second mixer stages for generation of sum and difference intermediate frequency signals, a phase sensitive detector, and first IF and second IF amplifiers for amplifying said sum and difference signals respectively as inputs to said phase sensitive detector said phase detector measuring the ratio of the sum and difference signals to provide an output signal which represents the angle away from the ground track to the target.

10. The target sensing device of claim 1 wherein said means for generating said broad fan beam containing said interference lobes comprises:

first and second interconnected antenna means, and wherein said means for varying the position of said interference lobes comprises a phase shifter whereby said first and second antenna means will generate a monopulse pattern containing a plurality of lobes.

11. The target sensing device of claim 10 comprising:

a drone aircraft carrying said sensor means, and means for directing said aircraft into said target.

12. The target sensing device of claim 11 wherein said means for directing said aircraft into said target comprises:

a fixed antenna, a mixer stage connected to said antenna, a local oscillator connected to said mixer stage for generating an IF signal from return signals from said target, an IF amplifier connected to the output of said mixer for amplifying said IF signal, a detector stage connected to the output of said IF amplifier for detecting said target from the carrier signal, a filter stage connected to the output of said detector stage for filtering out said carrier signals, and a phase detector stage connected to the output of said filter stage for providing steering signals to a control system whereby said aircraft is directed to home in one said target.

13. The target sensing device of claim 12 comprising:

means in said sensor for pre-programming said aircraft to maneuver to lock on said target.

* * * * *